United States Patent [19]

Kane et al.

[11] 4,292,365
[45] Sep. 29, 1981

[54] POLYMERIC MATS HAVING CONTINUOUS FILAMENTS WITH AN ASYMMETRICAL CROSS-SECTIONAL SHAPE

[75] Inventors: John L. Kane; Vikas M. Nadkarni, both of Newark, Ohio

[73] Assignee: Owens-Corning Fiberglas Corporation, Toledo, Ohio

[21] Appl. No.: 113,995

[22] Filed: Jan. 21, 1980

[51] Int. Cl.³ .............................................. D04H 1/58
[52] U.S. Cl. .................................. 428/288; 428/290; 428/332; 428/338; 428/340; 428/369; 428/375; 428/394; 428/395; 428/397
[58] Field of Search .............. 428/288, 290, 364, 369, 428/370, 375, 394, 395, 397, 399, 332, 338, 340

[56] References Cited

U.S. PATENT DOCUMENTS

| | | | |
|---|---|---|---|
| 3,169,899 | 2/1965 | Steuber | 428/198 |
| 3,314,122 | 4/1967 | Bundy | 156/62.4 |
| 3,378,398 | 4/1968 | Nottebohn et al. | 428/220 |
| 3,509,009 | 4/1970 | Hartmann | 428/296 |
| 3,652,753 | 3/1972 | Shemdin | 48/397 |
| 3,716,317 | 2/1973 | Williams et al. | 264/176 F |
| 3,849,241 | 11/1974 | Butin et al. | 264/211 |
| 4,118,531 | 10/1978 | Hauser | 428/370 |

FOREIGN PATENT DOCUMENTS 1089414 11/1967 United Kingdom.

Primary Examiner—James J. Bell
Attorney, Agent, or Firm—Ronald C. Hudgens; Robert F. Rywalski; Greg Dziegielewski

[57] ABSTRACT

A lofted mat of filaments is produced from process and apparatus including: supplying a plurality of streams of molten polymeric material; attenuating said streams of material into continuous filaments through the action of a stream of fluid moving from an attenuation means; said filaments being entrained in said fluid moving from said attenuation means, said filaments having non-uniform residual stresses established therein; moving said stream of fluid and filaments along a first surface positioned intermediate said attenuation means and a foraminous surface; establishing a vacuum at said foraminous surface; directing said stream of fluid and filaments into said foraminous surface obliquely oriented with respect to said first surface such that a first portion of said fluid separates from the filaments and passes through said foraminous surface and a second portion of said fluid moves said filaments along the foraminous surface; collecting said filaments in a randomly dispersed, substantially uniform layer having a first thickness; passing said layer through crimp inducing means adapted to permit said unbalanced, residual stresses to randomly crimp said filaments to form said lofted mat having a second thickness greater than said first thickness wherein said lofted mat is comprised of a lofted mat comprising a plurality of continuous polymeric filaments having an asymmetrical cross-sectional shape, the cross-sectional shape having a major dimension within the range from about 0.00150 inch to about 0.00350 inch, the filaments having a crimp factor within the range from about 0.1 to about 4 waves per inch of filament, said mat having a density within the range from about 0.33 pounds per cubic foot to about 1.74 pounds per cubic foot.

9 Claims, 3 Drawing Figures

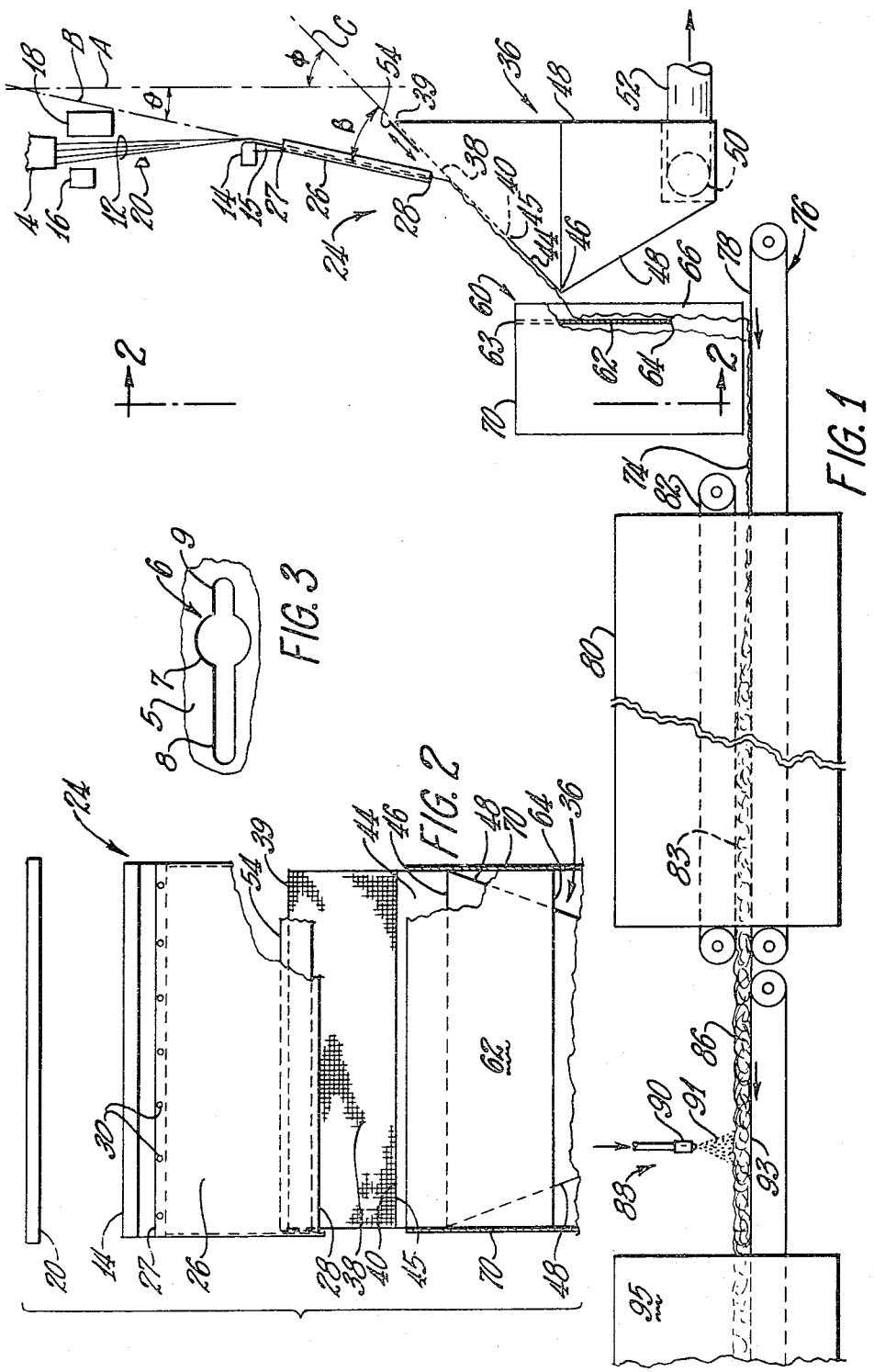

POLYMERIC MATS HAVING CONTINUOUS FILAMENTS WITH AN ASYMMETRICAL CROSS-SECTIONAL SHAPE

TECHNICAL FIELD

The invention disclosed herein relates to improved process and apparatus for fluidically attenuating streams of molten material into filaments and collecting said filaments to form a lofted mat.

BACKGROUND ART

Generally, lofted mats of polymeric filaments have been formed by producing continuous filaments of polymeric material, orienting the filaments for strength, cutting the continuous filaments into discrete segments, carding the discrete segments, and then applying a binder to form an integral, lofted mat.

Also it is well known to fluidically attenuate streams of material into filaments, but the degree of control over the filaments in such processes has generally not been great. In forming lofted mats of a relatively low density wherein the lofted mat is produced in a single continuous process, the need for control over the deposition of the filaments is especially critical for glass and/or polymeric filaments. Essentially, the attenuating fluid or medium must be separated from the filaments. One such system is disclosed in commonly assigned, copending U.S. application Ser. No. 099,060 filed Dec. 12, 1979.

DISCLOSURE OF THE INVENTION

This invention includes a product produced from process and apparatus for forming a lofted mat comprising supplying a plurality of streams of molten polymeric material; attenuating said streams of material into continuous filaments through the action of a stream of fluid moving from an attenuation means; said filaments being entrained in said fluid moving from said attenuation means, said filaments having non-uniform, residual stresses establish therein; moving said stream of fluid and filaments along a first surface positioned intermediate said attenuation means and a foraminous surface; establishing a vacuum at said foraminous surface; directing said stream of fluid and filaments into said foraminous surface obliquely oriented with respect to said first surface such that a first portion of said fluid separates from the filaments and passes through said foraminous surface and a second portion of said fluid moves said filaments along the foraminous surface; collecting said filaments in a randomly dispersed, substantially uniform layer having a first thickness; passing said layer through crimp inducing means adapted to permit said unbalanced, residual stresses to randomly crimp said filaments to form said lofted mat having a second thickness greater than said first thickness wherein the lofted mat is comprised of a lofted mat comprising a plurality of continuous polymeric filaments having an asymmetrical cross-sectional shape, the cross-sectional shape having a major dimension within the range from about 0.00150 inch to about 0.00350 inch, the filaments having a crimp factor within the range from about 0.1 to about 4 waves per inch of filament, said mat having a density within the range from about 0.33 pounds per cubic foot to about 1.74 pounds per cubic foot.

BRIEF DESCRIPTION OF THE DRAWINGS

FIG. 1 is a semi-schematic side view of a fiber/mat forming system according to the principles of this invention. FIG. 2 is a sectional view of the system shown in FIG. 1 taken along view 2—2.

FIG. 3 is a bottom view of the bottom wall of the feeder shown in FIG. 1.

BEST MODE OF CARRYING OUT THE INVENTION

As shown in FIGS. 1, 2, and 3, feeder 4 supplies a plurality of streams of molten polymeric materials, such as polystyrene, acrylics, polycarbonates, polypropylene, polyethylene terephthalate (also referred to as polyester) and the like, which are attenuated into filaments 12 by the high velocity stream of gas or fluid supplied by fluidic attenuation means or blower 14. The filaments 12 leaving blower 14 can be continuous or discontinuous, but in one aspect continuous filaments are preferred.

As shown in FIG. 3, feeder 4 is comprised of a bottom wall 5 having a plurality of asymmetrical orifices or openings 6 which can be any suitable shape. It has been found that an asymmetrical opening 6 comprised of a circular opening 7, a first slot 8 and a second smaller slot 9 extending outwardly from circular opening 7 in opposite directions can provide an "offset propeller-type" filament having the proper cross-sectional shape and crimp characteristics.

The asymmetrical cross-sectional shape of the filaments facilitates the inducement of non-uniform or unbalanced residual stresses in the continuous filaments 12 to facilitate the subsequent crimping of the filaments to produce a lofted mat 86.

In some instances, it is preferable to incorporate a quench air supply system 16 and a vacuum assisted quench air collector 18 to move a stream of cool air or gas transversely through the advancing filaments to quench the filaments to increase the degree of non-uniformity of the residual stresses imparted to the asymmetrical filaments. It has been found that for polystyrene filaments, quench air having a temperature of 60° F.–70° F. (15.5° C.–21.1° C.) and flowing at 50–100 fpm (15.2 m/min–30.4 m/min) across the newly formed filaments produces acceptable results provided the volumetric air flow is sufficient to satisfy the pumping requirements of the filaments.

Intermediate the quench air supply 16 and blower 14, an electrostatic charge inducement means 20 can be employed to maintain or facilitate a spaced-apart relationship between the individual filaments 12 to obtain a uniformly dispersed array of filaments, as is known in the art.

Blower 14, which is single sided, is adapted to produce continuous filaments 12 at velocities from about 5,000 to about 15,000 feet per minute (1,524 m/min–4,572 m/min). Preferably, blower is of the type disclosed in our co-pending application Ser. No. 009,059 filed Dec. 12, 1979, which is hereby incorporated by reference herein.

For controlled deposition of the substantially straight or non-crimped continuous filaments 12 moving from blower 14 which are entrained in the high velocity stream of attenuating fluid, such as air, supplied by blower 14, a major portion of the attenuating fluid must be separated from the filaments advancing therewith prior to encountering the collection region. According to this invention, a portion of the attenuating fluid is also employed to direct and control the deposition of the filaments 12 upon collection means 76. Air dissipation and separation system 24 is designed to separate a major portion of the attenuating fluid from the filaments 12 advancing therewith in a controlled manner while controlling a portion of such attenuation fluid to facilitate filament collection.

Separation system 24 is comprised of a first surface or "U" shaped duct 26, which is adapted to control and contain filaments and the stream of attenuating fluid, has a first end 27 and a second or distal end 28.

Blower 14 has an arcuate surface or projection 25 depending from the nozzle region thereof oriented to move the attenuating fluid therealong according to the Coanda effect. First end 27 is fastened to projection 15 of blower 14 by any suitable means such as screw-type fasteners 30 to form a smooth continuous surface to vacuum assisted separation system 36.

As is known, unconfined high velocity streams of gas or fluid, in addition to dissipating at downstream regions, also inspirate ambient air to be moved along therewith. Thus, for the purpose of this discussion, attenuating air includes such inspirated air.

Separation assembly 36 is comprised of a foraminous surface 38, a second, non-foraminous surface 44, and a housing 48. Foraminous surface 38 has a first end 39 attached to one side of housing 48 and a second end 40 attached to first edge 45 of second surface 44. The second edge 46 of second surface 44 is joined to the other side of housing 48. Foraminous surface 38 can be a 30×30 wire mesh screen having about 51% open area comprised of rectangularly oriented wires to about 0.0095" (0.24 mm) in diameter to form openings of about 0.024 square inches (15.5 sq. mm) each.

As can be seen in FIG. 1, foraminous surface 38 and second surface 44, which is contiguous therewith, form a substantially flat, planar surface obliquely oriented with respect to verical plane or line "A" forming an acute angle "$\phi$" between line "A" and plane or line "C" extending from surface 38.

Preferably, blower 14 and first surface 26 are positioned along a plane or line "B" extending from surface 26 to form an angle "$\phi$" between plane "B" and plane "A". Preferably, blower 14 is laterally displaced such that the filaments 12 bend in contact with blower 14, preferably blower 14 is at least 1" behind the vertical threadline. Angle "$\phi$" has a value within the range from about 10 to about 14 degrees, with 12 degrees being preferred.

Preferably, first surface 26 has a length from about 30 to 36 inches (0.76 m–0.91 m), with a length of 33 inches (0.84 m) being preferred. A distal or second end 28 of chute 26 is preferably located approximately ¾ inch to about 3 inches (19 mm–76.2 mm) from foraminous surface 38. Also, distal end 28 of first surface 26 should be positioned such that filaments 12 impinge foraminous surface 38 within the region from about ⅓ to about ⅔ of the distance between first end 39 and second end 40 of foraminous surface 38.

Housing 48 has a port 50 in communication with a means for establishing a vacuum in housing 48 such as a fan 52 to induce the attenuating fluid to separate from the filaments 12 and pass through foraminous surface 38.

In operation, a major or first portion of the attenuating fluid is separated from the advancing filaments 12 and passes through foraminous surface 38 into the chamber of housing 48 and removed by flow means 52. The second or remaining portion of the attenuating fluid moves along foraminous surface 38 and second surface 44 with the filaments 12 still being substantially entrained therein.

To induce a major portion of the attenuating fluid to pass through foraminous surface 38, the angle "B" between first surface 26 and foraminous surface 38 should be within the range from about 10 degrees to about 65 degrees with the range from about 20°–35° being preferred. In other words, angle "B" should be approximately 2 to 2½ times angle "$\phi$". Surface 38 which defines plane or line "C", is preferably oriented at an angle with respect to vertical line "A" within the range from about 40°–50°.

In addition to adjusting the amount of vacuum within housing 48 by adjusting or controlling flow means 52, flow control device or movable plate 54, which is positioned upstream of advancing filaments 12 immediately adjacent foraminous surface 38, is adapted to adjust the ratio of the first portion of fluid air separating from the filaments 12 and passing through surface 38 and the amount of the second portion of fluid that continues to move along surface 38 with the filaments substantially entrained therein.

Plate 54 is placed in contact with surface 38 to modify the total open area available for withdrawing the attenuating gas from blower 14 as well as to form a wedge or funnel consisting of surface 26 and plate 54 to direct at least some of the attenuating fluid that dissipates from the main stream advancing along surface 26 substantially parallel to and along surface 38.

Since the attenuating fluid is not completely confined once it leaves the blower, exact measurements of the amounts of attenuating fluid plus any inspirated ambient air introduced into the system are difficult to obtain. But, measurements indicate that the amount of air being sucked into housing 48 through surface 38 is approximately twice the amount of air moving along surface 44.

Intermediate primary collection means or conveyor 76 and vacuum assisted separation assembly 36, "C" shaped diverter assembly 60 is adapted to direct advancing filaments 12 along a path substantially perpendicular to endless foraminous belt 78 of collection means 76 to form a thin mat or layer 74 of randomly oriented, continuous filaments.

Diverter means or assembly 60 is comprised of a vertically oriented wall 62 laterally spaced from housing 48 a distance sufficient to permit additional attenuating fluid to dissipate. Otherwise, such air could "splash" against conveyor 76 and disrupt filament lay down.

Upper edge 63 of wall 62 is positioned above the path of the advancing filaments 12, and lower edge 64 of wall 62 is spaced from endless belt 78 of collection means 76 a distance sufficient to permit at least a fraction of said second portion of attenuating fluid to dissipate to reduce the tendency of said second portion of attenuating fluid to control the distribution of the filaments 12 upon collection means 76, that is to also reduce "splashing". It has been found that lower edge 64 should be spaced a distance from belt 78 within a range from about 6 to about 10 inches, with approximately 8 inches being preferred. As such, additional amounts of the second portion of the attenuating fluid are allowed to dissipate while still directing the filaments 12 along a path substantially perpendicular to the thin layer of filaments 74 being formed on belt 78.

In operation, second surface 44, which may be foraminous also, is contiguous with foraminous surface 38 and is adapted to direct filaments 12 into diverter 60, and it is to be understood that diverter 60 need not have a flat, straight wall 62, but may have a arcuate or V shaped wall or any other suitable shape depending upon the type of filament distribution desired.

On each side of wall 62, anterior panels 66 extend toward housing 48 a distance sufficient to retain the filaments 12 therebetween. Projecting in the direction opposite panels 66, posterior panels 70 extend a distance downstream sufficient to protect the filaments 12 approaching the collection means 76 from uncontrolled streams of ambient air. The lower extremeties of panels 66 and 70 are positioned immediately adjacent belt 78.

The relatively straight, continuous filaments having an asymmetrical cross-sectional shape are deposited upon belt 78 as a thin mat or layer 74 of randomly oriented filaments 12 having a first thickness within the range from about 1/64 inch to about ⅜ inch (0.4 mm–9.5 mm) or more depending upon the type of end product desired. Lofted mats can be produced wherein the thickness of the lofted mat 86 is within the range from about 8 to about 32 times the thickness of thin layer 74.

To form the lofted mat 86, the thin layer 74 advances through crimp inducing means or oven 70 on foraminous belt 78. In oven 80, a stream of heated gas, such as air, is directed substantially upwardly and transversely through layer 74 to permit the residual stresses in the filaments to overcome the strength of the material to cause the filaments 12 to shrink and crimp to form a bulky pile of crimped or wavey filaments 86. Generally, the heated air should be at a temperature above the glass transition temperature ($T_g$) of the filament material. For example, the glass transition temperature, $T_g$, of polystyrene is approximately 203° F. (95° C.). Therefore, the heated gas should have a temperature greater than 203° F. (95° C.), but less than the softening temperature of approximately 338° F. (170° C.) to induce the proper crimping of the filaments 12.

When heated above Tg, the polystyrene filaments, which remain amorphous, shrink and release the non-uniform residual stresses to produce a permanently curled or crimped filament. The mechanism for crimp and loft development in crystallizable polymers such as polypropylene and polyester is different; but the product effects are similar. The heated gas in oven 80 should be directed upwardly through layer 74 and bulky mat 86 at volumes and velocities sufficient to substantially float the layer 74 and/or mat 86 along belt 78 for maximum crimping.

In some instances, an upper conveyor 82 may be required to stabilize the mat 86 such that the thickness of the mat 86 is defined by the clearance between endless foraminous belt 83 of optional upper conveyor 82 and endless foraminous belt 78 of primary conveyor 76.

Lofted mat 86 then progresses to third conveyor 93 having a binder application system 88 associated therewith. As is known in the art, nozzle 90 which is adapted to be traversed back and forth across the path of the advancing mat 86 sprays a liquid coating or binder 91 into at least one side of mat 86.

Mat 86 having binder 91 thereon then advances through curing means or oven 95 to cure the binder 91 to form a lofted mat having a substantial degree of integrity.

The binder application system 88 and oven 95 can be of the type wherein the binder 91 is sprayed into one side of the lofted mat to a depth of approximately ½ the total thickness of lofted mat 86. The mat, then, is passed through the oven to cure such binder, and then the mat inverted to permit another sprayed application of binder into the opposite side of the mat to a depth of approximately ½ the total thickness of the lofted mat 86 which is then passed again through the oven to cure such binder. The mat may be rolled up or packaged at that point or may be passed once again through the oven for a final cure of the applications of the binder. That is, a triple pass type of oven, as is known in the art, may be employed.

The resulting lofted mat 86 is comprised of a plurality of continuous polymeric filaments having an asymmetrical cross-sectional shape wherein the cross-sectional shape has a major dimension within the range from about 0.00150 inch to about about 0.00350 inch (0.038 mm–0.089 mm), with a crimp factor within the range from about 0.1 to about 4 waves or crimps per inch of filament (or 3.9–157 waves or crimps per meter). Also, such a mat may have a density within the range from about 0.33 pounds per cubic foot to about 1.75 pounds per cubic foot (5.3 kg/cubic meter—28 kg/cubic meter).

In some instances, it is preferred that the cross-sectional shape of the filaments have a major dimension within the range from about 0.00175 inch to about 0.00225 inch (0.044 mm–0.057 mm). Also, the mat may have a weight within the range from about 1 ounce per square yard to about 18 ounces per square yard (33.9 g/square meter–610.2 g/square meter).

Depending upon the type of product desired, the amount of binder present in said lofted mat may range from about 5% to about 70% by weight of said mat. In some instances, the binder should be present in an amount from about 15% to about 25% by weight of the mat.

Any suitable type of binders or coatings 91 may be employed depending upon the type of characteristics desired in the resulting mat; acrylic emulsions and vinyl acetate materials such as Union Carbide binder type Ucar 879 acrylic emulsion and National Starch binder vinyl acetate acrylic copolymer binder No. 25-2804 may be employed.

Experiments performed in an updraft-type crimp oven reveal that an air temperature of approximately 230° F. (111° C.) with an air discharge velocity of 200 feet per minute can produce the desired crimp in the filaments 12 in approximately five seconds. Obviously, lower temperatures can be employed when the mat is subjected to such heating for longer periods of time.

To produce uniform crimping, it is believed that it is necessary to maintain the temperature of the heated air in the crimp oven within a narrow range, such as ±2° F. (±1.1° C.), to give uniform crimping. Furthermore, it has been shown that the heated air should be directed upwardly through the mat to produce the maximum amount of loft since down-flow air has a tendency to compress the mat against belt 78.

Polymeric fibers when asymmetrically quenched during forming to induce residual, unbalanced or non-uniform stresses therein will crimp when the stresses are relieved by treating the filaments with temperatures above the glass transition temperature if the filaments are under no substantial tension or compression. Such filaments may be asymmetrically quenched by an air blast, such as from quench air supply 16, including filaments having a symmetric cross-sectional shape. But, it has been found that in filaments 12 having asymmetrical cross-sectional shapes of the type produced by an orifice as shown in FIG. 3, the differences in residual stresses of imparted through a filament will be even greater in disparity due to the mass differential at various points in the cross section of the filament.

Such lofted mats can have utility in air filters, insulation, furniture padding, and civil engineering fabric type of applications and the like.

When non-uniform, residual stresses are imparted to the filaments 12, curl and crimp can be induced in the filaments, as a result of uneven shrinkage of the filament transition temperature of the filament material and/or chemical treatment. Further, entanglements between filaments during crimping impart integrity to the lofted mat 86, even in the absence of a binder applied thereto.

It is to be understood that feeder 4, blower 14, and attenuation fluid dissipation and separation system 24 can be readily adapted to produce a layer of inorganic filaments, such as glass. Such filaments then can be gathered as a mat or a tow as desired.

It is apparent that within the scope of the invention, modifications and different arrangements can be made other than as herein disclosed. The present disclosure is merely illustrative with the invention comprehending all variations thereof.

INDUSTRIAL APPLICABILITY

The invention described herein is readily applicable to the formation of continuous and/or staple organic and/or inorganic filaments and/or mats.

I claim:

1. A lofted mat comprising a plurality of continuous polymeric filaments having an asymmetrical cross-sectional shape, the cross-sectional shape having a major dimension within the range from about 0.00150 inch to about 0.00350 inch, the filaments having a crimp factor within the range from about 0.1 to about 4 waves per inch of filament, said mat having a density within the range from about 0.33 pounds per cubic foot to about 1.74 pounds per cubic foot.

2. The mat of claim 1 further comprising a binder to join said filaments together wherein said binder is present in said mat in an amount in the range from about 5% to about 70% by weight of said mat.

3. The mat of claim 2 wherein said binder comprises from about 15% to about 25% by weight of said mat.

4. The mat of claims 1, 2 or 3 wherein said cross-sectional shape has a major dimension within the range from about 0.00150 inch to about 0.00350 inch.

5. The mat of claims 1, 2 or 3 wherein said cross-sectional shape has a major dimension within the range from about 0.00175 inch to about 0.00225 inch.

6. The mat of claim 5 wherein said mat has a weight within the range from about 1 ounce per square yard to about 18 ounces per square yard.

7. The mat of claim 6 wherein said filaments are a material selected from the group of materials consisting of polystyrene, polypropylene, polyethylene terephthalate, acrylics and polycarbonates.

8. The mat of claim 7 wherein said binder is a material selected from the group of materials consisting of an acrylic emulsion and a vinyl acetate.

9. The mat of claim 8 wherein said filaments have an offset propeller type cross-sectional shape.

* * * * *

UNITED STATES PATENT AND TRADEMARK OFFICE
CERTIFICATE OF CORRECTION

PATENT NO. : 4,292,365
DATED : September 29, 1981
INVENTOR(S) : John L. Kane and Vikas M. Nadkarni It is certified that error appears in the above—identified patent and that said Letters Patent is hereby corrected as shown below:

Column 2, line 1: The sentence beginning "FIG. 2" should begin a new paragraph.

Column 3, line 10: The number "25" should be changed to "15".

Column 3, line 30: The word "to" should be changed to "of".

Signed and Sealed this

Twenty-third Day of February 1982

[SEAL]

Attest:

GERALD J. MOSSINGHOFF

Attesting Officer — Commissioner of Patents and Trademarks